United States Patent Office 3,553,032
Patented Jan. 5, 1971

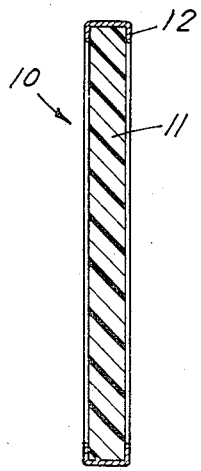
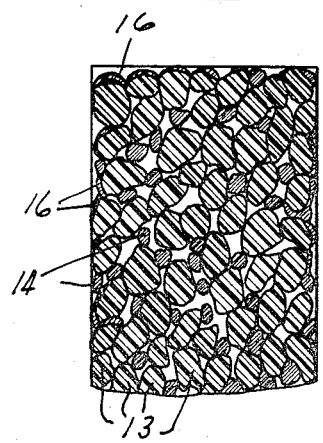
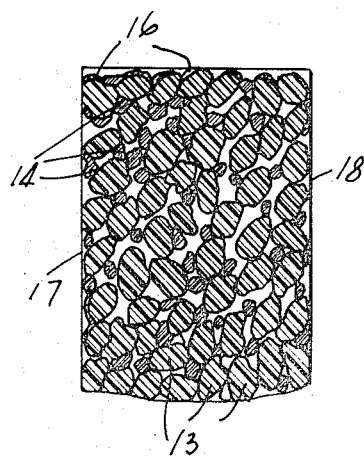
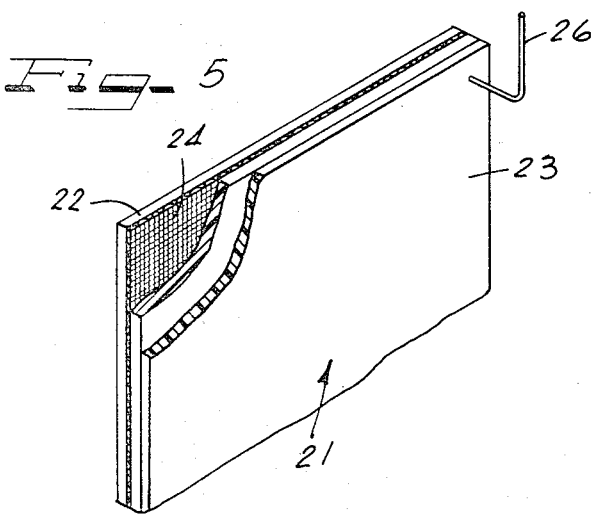
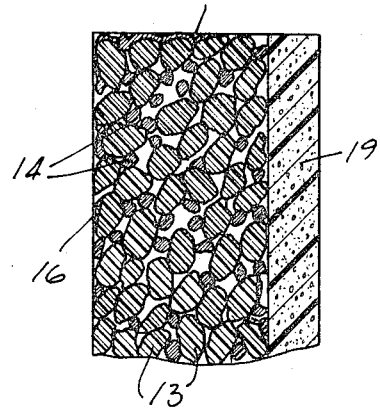

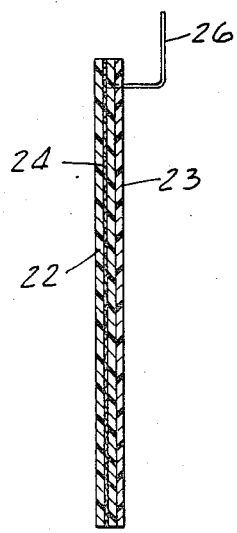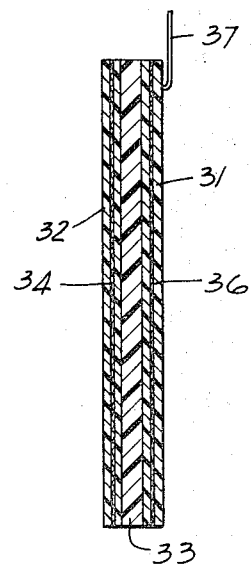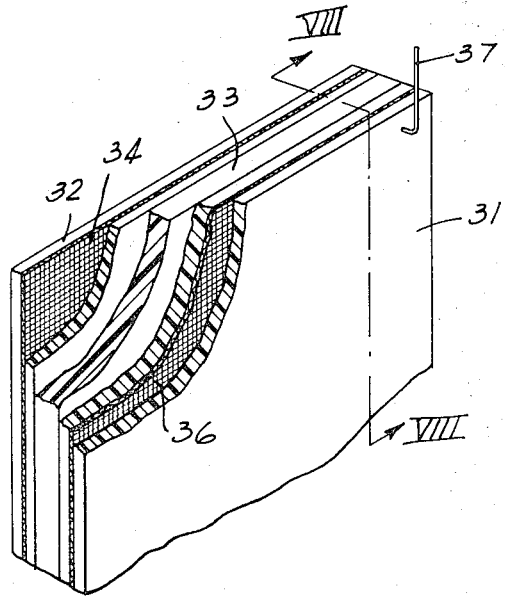

3,553,032
METHOD OF MAKING A FUEL CELL ELECTRODE BY THERMAL DECOMPOSITION OF SILVER CARBONATE
Hideo Baba, Masayoshi Gando, and Yoshio Yamashita, Tokyo, Japan, assignors to Sony Corporation, Tokyo, Japan, a corporation of Japan
Original application Oct. 25, 1966, Ser. No. 589,340. Divided and this application Jan. 21, 1969, Ser. No. 810,065
Int. Cl. B29d 27/00; H01m 13/04
U.S. Cl. 136—120                           4 Claims

ABSTRACT OF THE DISCLOSURE

A method of making a fuel cell electrode is disclosed by forming a pressed layer of a polymer, an electrically conductive material and silver carbonate and thermally decomposing the silver carbonate to form silver and render the layer porous.

---

This application is a division of our copending application Ser. No. 589,340, filed Oct. 25, 1966.

The present invention relates to improved electrodes for fuel cells, and, more specifically, to improved fuel cell electrodes which are suitable for operation at low temperatures.

The gas diffusion electrode in a fuel cell system requires the establishment of a three-phase interface of gas, the solid active electrode, and the ionic electrolyte. At the interface, a process of adsorption and deadsorption occurs, producing ions and an electrical charge. The electrical charge is drained from the electrode through an external circuit and the fuel ions react with the oxidizing ions to form a neutral product such as water.

For efficient operation, the gas diffusion electrode must meet a number of requirements, such as a high degree of porosity, a large interface area, high conductivity, high mechanical strength and chemical stability. The most serious problem arising in gas diffusion electrodes for fuel cells occurs because the gas oxidizing side of the electrode in wetted with the electrolyte passing through the electrode, resulting in the shortening of the life of the cell.

Some attempts have been made to obtain an electrode composed of an active oxidizing catalyst which does not become wetted by the electrolyte and which has a large surface area. One such electrode consists of a base plate of porous carbon or porous nickel coated with a paraffin solution to form a water repellent layer on the surface. In this type of electrode, however, a rise in the electrode temperature and variations in the composition of the electrode adversely affect the water repellency of the electrode. In addition, the paraffin layer must pass an electric current therethrough while still being sufficiently water repellent. Consequently, the thickness of the paraffin layer must be carefully chosen and controlled, but it is difficult in practice to control this thickness. Consequently, it is difficult to produce an electrode having uniform characteristics.

Other attempts have been made wherein the porous electrode is treated in a solution of a synthetic resin to form a water repellent layer on the electrode. This method, however, is quite inefficient and the life of the electrode produced is quite short.

One of the objects of the present invention is to provide a gas diffusion electrode for a fuel cell which is mechanically rigid and is suitable for mass production.

Another object of the invention is to provide a highly efficient electrode for a fuel cell which can be operated at low temperatures.

Still another object of the invention is to provide an improved electrode for a fuel cell which does not require critical processing controls.

Another object of the invention is to provide a method for the manufacture of the improved electrodes of the present invention.

Other objects, features and advantages of the present invention will become apparent to those skilled in the art from the following description taken in conjunction with the accompanying drawings, in which:

FIG. 1 is a cross-sectional view illustrating one example of an electrode produced according to the present invention;

FIG. 2 is a greatly enlarged fragmentary cross-sectional view of an electrodes produced according to this invention;

FIG. 3 is a greatly enlarged fragmentary cross-sectional view of a modified form of electrode;

FIG. 4 is a greatly enlarged fragmentary cross-sectional view illustrating still another form of electrode according to this invention;

FIG. 5 is a view in perspective of a further modified form of the invention;

FIG. 6 is a cross-sectional view of the electrode shown in FIG. 5;

FIG. 7 is a view in perspective, partially broken away, of a further modified form of the present invention; and FIG. 8 is a cross-sectional view of the electrode shown in FIG. 7 taken substantially along the line VIII—VIII.

As shown in the drawings:

In FIG. 1, reference numeral 10 indicates generally a fuel cell electrode produced according to the present invention. The electrode 10 may include a matrix 11 of particles of a water repellent polymer sintered together or otherwise bound together to a self-sustaining porous form. As will become apparent from a succeeding portion of this description, the matrix 11 also includes electrically conductive catalystic particles distributed throughout the polymeric matrix, and also includes thin deposits of the catalytic material on the particles of resin making up the matrix. A collector layer 12 consisting of silver or the like may be coated on or vapor-deposited on the outer peripheral surface of the thin circular electrode 10.

The particularly preferred water repellent polymer for use in accordance with the present invention is a fluorinated resin. These resins include materials such as polytetrafluoroethylene, fluorinated ethylene-propylene, chlorotrifluoroethylenes, and polyvinylidine fluorides. These fluoroplastics do not actually melt, but change into a gel at temperatures somewhat above 412° C.

The fluorinated polymer is combined with particles of an electrically conductive catalytic material of which silver is by far the preferred example, since this metal is an efficient catalyst for fuel cell reactions.

A third ingredient in the composition is a silver salt which has the property of decomposing, with the evolution of gas to form metallic silver at a temperature less than the softening temperature of the fluorinated polymer. Silver carbonate is particularly preferred for this use. At temperatures of about 100° C., the silver (ous) carbonate decomposes to yield silver (ic) oxide and carbon dioxide. At temperatures of about 220° C., in vacuum conditions, the silver (ic) oxide is reduced to the silver (ous) oxide with the evolution of oxygen. At temperatures of about 330° C., the silver (ous) oxide is reduced to metallic silver with the evolution of additional amounts of oxygen. The metallic silver which results is deposited as a very thin layer upon the particles of the water repellent polymer.

In a typical example, particles of 10 mesh polytetrafluoroethylene can be combined with 100 mesh particles of silver, and silver carbonate powder in the weight ratio of 1:20:30. The mixture then is packed into a mould where it is subjected to a pressure of approximately 150 kilograms per square centimeter and moulded into a desired configuration. This results, for example, in the production of a circular thin plate having a thickness of about 1 millimeter. In order to improve the uniformity of dispersion, it is preferable to add a suitable organic vehicle such as methylethyl ketone and alcohol or the like to the mixture of particles during mixing.

The thin plate can then be heated in a vacuum oven at a temperature of, for example, approximately 350° C. which is above the decomposition temperature of silver carbonate but is lower than the softening temperature of the fluorinated polymer. The carbon dioxide which is generated during this decomposition renders the plate uniformly porous. Heating of the plate should be effected gradually so as to prevent cracking which might result from the sudden release of carbon dioxide gas. Furthermore, it is desirable to maintain the plate at a temperature of about 350° C. for an hour or so, or less if the temperature is above 350° C. If the pressure generated in the moulding process is too high, the carbon dioxide gas is not uniformly ejected through the thin plate, but may be vented only through a limited portion of the plate with the result that the plate is not made uniformly porous.

A greatly enlarged cross-sectional view of the finished plate is illustrated in FIG. 2 of the drawings. During the moulding operation, the polymer particles 13 are sintered together into a porous matrix, and the silver particles 14 adhere to the matrix. Additional deposits of silver 16 become deposited on the particles of the polymer and provide very active reaction sites for the catalytic reaction which occurs.

When an electrode of the type illustrated in FIG. 2 is used in a fuel cell, the electrolyte enters into the electrode through the pores defined by the polymer particles 13 in the matrix and the silver particles 14, but the electrolyte does not leak into the gas contacting side because the polymer particles are water repellent. On the fuel gas side, the fuel gas enters the electrode through the pores between the polymer particles and the silver particles. As a result, there is formed in the electrode an interface of the electrolyte, the fuel gas, and the silver particles. The interface is electrically connected to the charge collector layer 12 through the silver particles 14 and the silver 16 coated on the polymer particles, thus supplying the electrical charge to an external circuit.

The electrode of the present invention has a long service life since it utilizes a relatively heat and corrosion resistant resin without using material such as paraffin. Furthermore, the interface of the electrolyte, fuel gas and silver in the intermediate portion of the electrode is relatively large so that chemical energy can be converted into electrical energy very efficiently. Where the electrode is used as an oxygen electrode, the silver particles 14 serve not only as conductive members but also as catalysts to enhance the activity of the electrode.

By variation in the pressures of moulding and the temperature range for sintering, a porous electrode of predetermined porosity can be produced. Furthermore, the silver which results from the decomposition of the silver salt is coated on the polymer particles to enhance the catalytic function, insuring high conductivity, high activity, and high efficiency of the electrode.

In the electrode structure of FIG. 2, the polymer and the silver powder are shown uniformly intermixed, but it is also possible to provide a concentration difference at opposed surfaces of the electrode. This type of structure is shown in FIG. 3 where the ratio of silver particles 14 to the polymer particles 13 is made large on the face 17 which contacts the electrolyte, and small on the face 18 which contacts the gas.

In the construction shown in FIG. 4, the electrode structure as shown in FIG. 2 is shown combined with the porous plate 19 composed of a fluorinated polymer and bonded to the matrix of fluorinated polymer and silver particles. With the structure shown in FIGS. 3 and 4, with the side of the electrode having the greater concentration of silver powder exposed to the electrolyte, the electrolyte is prevented from entering into the gas side of the electrode. Consequently, the type of structure shown in FIGS. 3 and 4 provides some advantages over that shown in FIG. 2.

FIGS. 5 and 6 illustrate another example of an electrode used according to the present invention. The electrode 21 includes a porous conductive layer 22 containing catalysts and a water repellent layer 23 which is permeable to gas. The porous conductive layer 22 may be composed of a mixture containing about 50% by weight silver carbonate powder, 20% by weight of silver powder (200 mesh) and 30% by weight of polytetrafluoroethylene (10 mesh). If necessary or desirable, materials such as ammonium carbonate or naphthalene are added to the mixture in the ratio of about 20 to 30% by weight with respect to the amount of the mixture and mixed therewith. The silver carbonate powder and the silver powder render the electrode portion conductive and perform the catalytic function while the addition of ammonium carbonate or naphthalene renders the layer 22 porous since it facilitates the formation of pores resulting from gas generation due to decomposition of the silver carbonate.

The porous water repellent layer 23 can be made from polytetrafluoroethylene powder having a particle size of about 10 mesh and a bulk density of approximately 0.35. Particularly good results are obtained with small particle sizes of the polymer. Ammonium carbonate can be added to the polymer powder in the ratio of about 30 to 80% by weight relative to the latter, and mixed therewith. The ammonium carbonate functions as a foaming agent for rendering the polymer porous, and is decomposed by heat at a temperature less than the softening temperature of the fluorinated polymer. These two mixtures are introduced into a pressure mould and moulded in layers. The mixture for the layer 22 is tamped into the mould and leveled, and a nickel screen 24 is embedded in this layer. Next, the mixture for the gas permeable water repellent layer 23 is laid on the first mixture, and the composite is subjected to a pressure of approximately 300 kilograms per square centimeter during moulding. An electrical conductor 26 is secured to the screen 24 on the gas side of the electrode to provide an electrical lead.

It is also possible to preform the layers 22 and 23 and join the two by heat pressing the pressed polymer plate onto the preformed metal containing plate.

The electrode made in this manner can then be heated in a furnace under reduced pressures, with the heating temperature being gradually raised and maintained at approximately 400° C. for twenty minutes. During the heating of the electrode, the silver carbonate is decomposed into silver and carbon dioxide while the ammonium carbonate is also decomposed into ammonia and carbonic acid gas. This produces a porous electrode plate which has the characteristics of high activity, large surface area and porosity.

While the foregoing has described the method for the manufacture of an electrode having a silver catalyst, it is possible to replace the silver with other conductive materials, and use a different metal as the catalyst. For example, nickel or carbon can be used in place of the silver for rendering the layer 22 conductive. Furthermore, a nickel metal salt such as nickel oxalate can be employed instead of nickel.

A further example of the present invention appears in FIGS. 7 and 8 of the drawings. The electrode illustrated in these two figures includes a porous fluorinated polymer layer 31 located on the gas side of the electrode, a porous conductive layer 32 containing catalysts and positioned on the electrolyte side of the electrode, and a porous mixed layer 33 between the two and containing the matrix of resin, a conductive material, and one or more catalysts.

Of course, the conductive material and the catalyst may be of the same material.

The electrode of FIGS. 7 and 8 can be manufactured in the following way. "Teflon" (polytetrafluoroethylene) powder of about 10 mesh and a bulk density of 0.35 is combined with ammonium carbonate in the ratio of 30 to 80% by weight of the carbonate based on the weight of the "Teflon." The two powders are mixed thoroughly. The silver-polymer layer is prepared by mixing silver carbonate powder, 200 mesh silver powder, and "Teflon" powder in the ratios of 50%, 20% and 30% by weight, respectively. Ammonium carbonate in the amount of 20 to 30% by weight of the mixture is added to the mixture and mixed therewith. The silver carbonate powder and silver powder form a conductive layer on the electrode portion and also perform the catalytic function, while the ammonium carbonate renders the "Teflon" porous.

The porous conductive layer may be prepared by mixing silver powder of 200 mesh with silver carbonate in the ratio of 50% by weight of silver powder relative to the carbonate and ammonium carbonate is added to the mixture in the ratio of 30 to 50% by weight of the mixture. The three ingredients are then thoroughly mixed.

The three mixtures are then packed in a pressure mould and moulded in layers. Thus, the mixture for the layer 32 is produced in the mould and a wire mesh 34 of nickel or the like is embedded in this layer. Then, the mixture for the layer 33 is laid over this first layer, and the mixture for the porous conductive layer 31 is applied on top of the second layer. The conductive wire mesh 36 is embedded in this electrically conductive layer. A composite is then moulded at a pressure of approximately 300 kilograms per square centimeter, producing a self-sustaining plate. A portion of the wire mesh 36 is taken out through the conductive layer to form an electrical lead 37. The electrode plate thus produced is then heated in a furnace under a reduced pressure with the heating temperature being gradually raised and maintained at approximately 400° C. for twenty minutes. During the heating, the silver carbonate is decomposed, and so is the ammonium carbonate, thereby providing porous plate structures. For the purpose of extending the life of the electrode, it is preferable to add a small amount of "Teflon" powder to the silver layer which is wetted with the electrolyte, or to render the silver layer somewhat water repellent after the heat treatment.

The following specific examples set forth other embodiments of the invention to illustrate the same more particularly.

Thirty parts of "Teflon" powder (10 mesh), thirty-five parts of silver powder (200 to 300 mesh) and thirty-five parts of silver carbonate powder were mixed together. The mixture was subjected to pressure moulding together with a nickel wire netting contained therein under a pressure of 160 kilograms per square centimeter, to produce a sheet measuring 1.5 mm. in thickness. The pressed material was heated, with a temperature rise of from 100° C. to 380° C. at the rate of 100° C. per hour, and maintained in vacuum for thirty minutes. When this electrode was used as the anode, having one surface exposed to air and the other exposed to a potassium hydroxide electrolyte, and the cathode was an aluminum plate, a current density of 22 milliamperes per square centimeter was obtained with a terminal voltage of 0.6 volt at normal temperatures.

In another example, thirty parts of "Teflon" powder of 10 mesh, fourteen parts of nickel powder of 200 to 300 mesh, fifty-six parts of silver carbonate powder, and twenty-five parts of ammonium carbonate were mixed together. The mixture was pressed together with a wire mesh under a pressure of 300 kilograms per square centimeter and moulded into a sheet measuring 1.5 millimeters in thickness. The pressed material was heated at temperatures from 100 to 400° C. at the rate of 100° C. rise per hour, and maintained in vacuum for ten minutes. When this electrode was used as the anode, using air at one surface and a potassium hydroxide electrolyte, with a zinc plate as a cathode, a charge having a current density of 64 milliamperes per square centimeter was obtained when the terminal voltage was 0.7 volt at normal temperature.

In another example, twenty parts of 10 mesh "Teflon" powder, twenty parts of silver powder of 200 to 300 mesh, sixty parts of silver carbonate powder and sixty-five parts of ammonium carbonate were mixed. This mixture was pressed together with a nickel wire mesh under a pressure of 300 kilograms per square centimeter and moulded into a sheet measuring 1 mm. in thickness. The pressed material was heated with a temperature from 100° C. to 400° C. at a rate of 150° C. per hour, and maintained in vacuum for twenty minutes. When this electrode was used as the anode in a fuel cell having one surface exposed to air and the other to potassium hydroxide electrolyte, using a zinc plate cathode, a charge having a current density of 65 milliamperes per square centimeter was obtained when the terminal voltage was 0.6 volt at normal temperatures.

It will be evident that various modifications can be made to the above-described examples without departing from the scope of the present invention.

We claim:

1. The method of making a fuel cell electrode comprising a porous bonded matrix of water repellent polymer particles having a thin coating of silver and particles of an electrically conductive material interspersed therein and adhering to said matrix which comprises forming a mixture of a water repellent polymer, particles of an electrically conductive material, and particles of silver carbonate, molding said mixture under pressure to form a coherent structure and heating the resulting coherent structure at a temperature above the decomposition temperature of said silver carbonate but below the softening point of said polymer to thereby form silver and liberate carbon dioxide gas which diffuses through said structure to render it substantially porous.

2. The method of claim 1 in which said polymer is a fluorocarbon polymer.

3. The method of claim 1 in which said polymer is polytetrafluoroethylene.

4. The method of claim 1 in which said heating is carried out under vacuum conditions.

References Cited

UNITED STATES PATENTS

| | | | |
|---|---|---|---|
| 3,336,423 | 8/1967 | Le Cair | 136—86X |
| 3,341,936 | 9/1967 | Sanstede et al. | 136—86X |
| 3,382,067 | 5/1968 | Sanstede et al. | 136—120X |
| 3,385,780 | 5/1968 | I-Ming Feng | 136—120X |
| 3,395,049 | 7/1968 | Thompson | 136—86X |
| 3,120,457 | 2/1964 | Duddy | 136—120 |
| 3,350,200 | 10/1967 | Sanstede et al. | 136—120X |
| 3,409,474 | 11/1968 | Jung et al. | 136—120 |
| 3,442,710 | 5/1969 | Menard | 136—76X |

WINSTON A. DOUGLAS, Primary Examiner

M. J. ANDREWS, Assistant Examiner

U.S. Cl. X.R.

264—41, 54, 127